3,424,804
PREPARATION OF HIGHLY FLUORINATED
AROMATIC COMPOUNDS
Julian Frodo Tilney-Bassett, Avonmouth, England, assignor to Imperial Smelting Corporation (N.S.C.) Limited, London, England, a British company
No Drawing. Filed Jan. 3, 1966, Ser. No. 518,009
Claims priority, application Great Britain, Jan. 4, 1965, 326/65
U.S. Cl. 260—650     3 Claims
Int. Cl. C07b 1/00; C07c 17/34, 25/04

ABSTRACT OF THE DISCLOSURE

A method of preparing a monobromotetrafluorobenzene of the formula $C_6F_4HBr$ involving the reduction of the dibromotetrafluorobenzene of the formula $C_6F_4Br_2$ in the presence of a combination of powdered zinc and glacial acetic acid at about 0–200° C. for up to about 30 hours. The compounds 2,3,4,6-tetrafluorobromobenzene and 2,3,5,6-tetrafluorobromobenzene.

---

This invention relates to a method for preparing hydrofluorobenzenes, and hydrohalogenofluorobenzenes, and is more particularly concerned with the preparation of hydrohalogenotetrafluorobenzenes, that is to say, compounds of formula $C_6F_4HX$ where X is chlorine, bromine or iodine.

Di-bromo or di-iodo-tetrafluorobenzene can readily be prepared by the halogenation of a tetrafluorobenzene using bromine or iodine in the presence of oleum or an aluminium halide. However, this process is unsatisfactory for the introduction of only one bromine or iodine atom into the tetrafluorobenzene ring, since even if only sufficient bromine was used to replace only one hydrogen atom and the reaction was carried out at a controlled temperature, the yield of the required bromotetrafluorobenzene was only moderate.

This is apparently due to two causes. Firstly, the product is converted to some extent to the water-soluble bromotetrafluorobenzene sulphonic acid and secondly, the hydrohalogenotetrafluorobenzene itself is readily brominated by the bromine/oleum reaction mixture. Thus, the initial product of the reaction and the starting material compete for the available bromine. The reaction is described in more detail in the first example below.

The present invention provides a method of preparing hydrofluorobenzene and hydrohalogenofluorobenzene in good yield.

The invention provides a method of preparing a hydropolyfluorobenzene, or a hydrohalogenopolyfluorobenzene which comprises at least partially reducing a polyfluorobenzene containing at least one non-fluorine halogen atom with a selective reducing agent.

The method may be generally expressed by the equation:

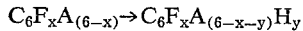
$$C_6F_xA_{(6-x)} \rightarrow C_6F_xA_{(6-x-y)}H_y$$

where A is chlorine, bromine or iodine, $x$ is 3, 4 or 5 and $y$ is 1 or 2.

The reducing agent which has been found most applicable to date is the combination of an acid and a metal. While it is not desired to limit the invention by any particular mechanism it would appear possible that those combinations which would in themselves generate hydrogen are valuable in this process. Hydrogen need not, however, appear as such in the present process. Preferably, the acid is glacial acetic acid although mineral acids such as hydrochloric or sulphuric acids, and other carboxylic acids may be used. The metal is usually zinc (either as a granulate or more advantageously as powder) although aluminium, iron and tin could also be used.

The method is applicable to the reduction of halogenopolyfluorobenzenes in which the other halogen atoms may be chlorine, bromine or iodine.

Generally, it is advantageous to use 1 gram atom of the metal per gram atom of halogen which it is desired to replace by hydrogen. In some cases, however, it may be advantageous to use a 20% to 200% excess of the metal powder.

Temperatures within the broad range from 0° to 200° C. may be used for the reaction. Generally the reaction proceeds at between room temperature and reflux temperature, and may be completed by refluxing the acid solution. In any case, reaction temperatures will normally be from 50° C. to 150° C. Normally, the reaction will be carried out at atmospheric pressure, but subatmospheric and superatmospheric pressure may also be used. The reduction may be carried out for up to 30 hours. From 2 to 10 hours is a preferred time-range.

One advantage of the process according to the invention is that any one of the three isomeric monohalogenotetrafluorobenzenes may be readily prepared from the corresponding dihalogeno compound.

The halogeno-substituted starting material may itself be produced by the reaction of the corresponding polyfluorobenzene with the corresponding halogen in the presence of oleum or a suitable halogen carrier. This reaction itself produces a proportion of the hydrohalogeno compound which may be retained and added to that product produced by the method of this invention.

These starting materials may also be produced by halogen exchange reactions involving polyhalogenobenzenes and alkali-metal fluorides or by de-halogenation of polyhalopolyfluorocyclohexanes or cyclo-hexenes.

The method described may be used for introducing hydrogen atoms into fluorinated polynuclear aromatic compounds.

The invention still further provides the novel compounds of the class $C_6F_4HX$ where X is chlorine, bromine or iodine, both per se and when prepared by the above method, bromo-2,3,4,5- 2,3,4,6-, and 2,3,5,6-tetrafluorobenzenes are especially valuable products of the process of the invention.

The compounds prepared by means of this process are useful as heat and radiation-stable fluids for specialised, e.g. nuclear reactor coolant or dielectric, uses. They also have utility as chemical intermediates as the hydrogen atom in the ring may be replaced by other substituents. In this way chemical products of interest as polymer raw materials may be produced. Thus, tetrafluorohydrohalogenobenzenes may be converted into fluorinated biphenyls (by a coupling reaction), which in turn may be converted into fluorinated biphenyl dicarboxylic acids which are useful as polymer intermediates.

The invention will be further described by reference to the following non-limiting examples. The temperatures referred to in these examples (as elsewhere in the specification and claims) are measured in degree centigrade.

Example 1.—Bromination of 1,2,3,4-tetrafluorobenzene

Oleum (266 g., 65% $SO_3$) was added dropwise to a stirred mixture of 1,2,3,4-tetrafluorobenzene (320 g.) and bromine (336 g.), whilst keeping the temperature of the mixture below 0°. After 30 minutes at this temperature the mixture was kept at 15° for 15 hours, then poured into ice. The organic liquid was washed with a solution of sodium metabisulphite and distilled to give 2,3,4,5-tetrafluorobromobenzene (208 g.) (42.6% yield), B.P. 48–55°/25 mm., $n_D^{22}$ 1.4650. (Found: C, 31.6; H, 05;

F, 33.6. $C_6HBrF_4$ requires C, 31.4; H, 0.4; F, 33.2%) and 1,2-dibromotetrafluorobenzene (134 g.) (20.4% yield), B.P. 93–96°/25 mm., $n_D^{24}$ 1.5151.

Example 2.—Reduction of 1,2-dibromotetrafluorobenzene 1,2-dibromotetrafluorobenzene (419 g.) was heated with zinc powder (99 g.) in refluxing glacial acetic acid (750 mls.) for 2 hours and then diluted with water. Steam distillation of the mixture and distillation of the organic steam distillate gave a product (288 g.) containing 1,2,3,4-tetrafluorobenzene (3%), 2,3,4,5-tetrafluorobromobenzene (91%), and 1,2-dibromotetrafluorobenzene (6%), by gas chromatography. Fractionation through an 18" column packed with glass helices gave 2,3,4,5-tetrafluorobromobenzene (258 g.) (82.6% yield), B.P. 142°. $n_D^{22}$=1.4650. Found: C, 31.6; H, 0.5; F, 33.3% $C_6HBrF_4$ requires C, 31.4; H, 0.4; F, 33.2%.

Example 3.—Reduction of 1,3-dibromotetrafluorobenzene 1,3-dibromotetrafluorobenzene (308 g.), glacial acetic acid (500 ml.) and zinc dust (72.7 g. 90% zinc content) were reacted using the same procedure as given in Example 2 and gave 2,3,4,6-tetrafluorobromobenzene (68.5 g. 74% yield) B.P. 141–142°, $n_D^{19}$ 1.4682. (Found: C, 31.5; H, 0.5; F, 33.2%).

Example 4.—Reduction of 1,4-dibromotetrafluorobenzene

To a mixture of 1,4-dibromotetrafluorobenzene (154 g.), and glacial acetic acid (300 cc.) at 80° was added zinc dust (36 g.) in ten approximately equal portions during 30 minutes. The reaction was exothermic. The mixture was then heated under reflux for 20 minutes, diluted with an equal volume of water and steam distilled to give a liquid (102.5 g.), which was washed with water fractionally distilled to give 2,3,5,6-tetrafluorobromobenzene (60 g.) (52.4% yield), B.P. 145–147°.

Example 5

This example compares the reduction of the three isomeric dibromotetrafluorobenzenes. In each case the dibromotetrafluorobenzene (0.1 mole), zinc powder (0.22 mole), and glacial acetic acid (150 cc.) were refluxed for 2–10 hours. The mixture was then steam distilled and the organic layer was dried and weighed and analysed by gas chromatography. The results are summarised in the following table:

Example 6

1,3,5-trichloro 2,4,6-trifluorobenzene (33.6 g. 0.10 mole), and zinc dust (7.7 g. 90% purity, 0.11 mole) and glacial acetic acid (50 ml.) were heated at reflux for 21 hours. The mixture was then steam distilled and a white solid (21 g.) was collected. Analysis by gas chromatography showed that this solid contained 91% unchanged trichlorotrifluorobenzene, 8% 1,3-dichloro 2,4,6-trifluorobenzenes and 3% of an unidentified compound. The dichlorotrifluorobenzene, a known compound, had the same chromatography retention time as that of an authentic sample.

The compounds prepared by the process of the invention further show activity as analgesic agents.

Experiments on mice are demonstrated in the following table:

TABLE

| Compound | B.P. (°C.) | Analgesic activity in anti-writhing test | |
|---|---|---|---|
| | | No protected/no dosed | Dose level (mg./kg.) |
| Chloro-1,3,5,6-tetrafluorobenzene | 126 | 6/10 | 128 |
| Bromo-2,3,4,5-tetrafluorobenzene | 142 | 10/10 | 128 |

I claim:
1. A method of preparing a monobromotetrafluorobenzene of the formula $C_6F_4HBr$ which comprises reducing the dibromotetrafluorobenzene of the formula $C_6F_4Br_2$ with a reducing agent which is a combination of powdered zinc and glacial acetic acid at a temperature of about 0–200° C. and a reaction time up to about 30 hours and separating the monobromotetrafluorobenzene.

2. A method as claimed in claim 1, in which from one to three gram atoms of zinc powder per gram atom of bromine to be replaced by hydrogen are employed.

3. A method as claimed in claim 1, in which the reaction temperature is from 50° C. to 150° C. and the reaction time from 2 to 10 hours.

| Time of reduction (hr.) | Isomer of $C_6F_4Br_2$ being reduced | Reducing agent | Percent yields | | | C recovery (percent) |
|---|---|---|---|---|---|---|
| | | | $C_6H_2F_4$ | $C_6HBrF_4$ | $C_6Br_2F_4$ | |
| 2 | p | Zn powder | 90 | 10 | | 71 |
| 5 | p | do | 89 | 11 | | 89 |
| 2 | m | do | 53 | 47 | | 89 |
| 2 | m | do | 39 | 61 | | 95 |
| 10 | m | do | 65 | 35 | | 87 |
| 2 | m | Zn granulated | 1 | 56 | 43 | 94 |
| 2 | o | Zn powder | 14 | 86 | | 95 |

References Cited

Siegmund et al.: Proc., Soc. Expt. Biol. Med., 95, pp. 729–31 (1957).

LEON ZITVER, *Primary Examiner.*

HOWARD T. MARS, *Assistant Examiner.*

U.S. Cl. X.R.

167—65; 176—44; 252—66, 77; 260—649